(12) United States Patent
Kitano

(10) Patent No.: US 12,483,783 B2
(45) Date of Patent: Nov. 25, 2025

(54) RADIATION GENERATION DEVICE

(71) Applicant: FUJIFILM CORPORATION, Tokyo (JP)

(72) Inventor: Koichi Kitano, Tokyo (JP)

(73) Assignee: FUJIFILM CORPORATION, Tokyo (JP)

(*) Notice: Subject to any disclaimer, the term of this patent is extended or adjusted under 35 U.S.C. 154(b) by 138 days.

(21) Appl. No.: 18/462,438

(22) Filed: Sep. 7, 2023

(65) Prior Publication Data

US 2024/0089594 A1 Mar. 14, 2024

(30) Foreign Application Priority Data

Sep. 13, 2022 (JP) ................. 2022-145493

(51) Int. Cl.
*H04N 23/661* (2023.01)
*H04N 23/30* (2023.01)
*H04N 23/65* (2023.01)

(52) U.S. Cl.
CPC ........... *H04N 23/661* (2023.01); *H04N 23/30* (2023.01)

(58) Field of Classification Search
CPC ..... H04N 23/661; H04N 23/30; H04N 23/635
See application file for complete search history.

(56) References Cited

U.S. PATENT DOCUMENTS

| 12,133,757 B2* | 11/2024 | Saito ................. A61B 6/463 |
| 2013/0279657 A1 | 10/2013 | Hiroike |
| 2016/0029993 A1 | 2/2016 | Hiroike |
| 2018/0303451 A1 | 10/2018 | Nakamura |
| 2021/0275120 A1* | 9/2021 | Bettoyashiki ........ G06V 10/764 |

FOREIGN PATENT DOCUMENTS

| JP | 2013153878 A * | 8/2013 |
| JP | 2013-223539 A | 10/2013 |
| JP | 2018-183397 A | 11/2018 |

* cited by examiner

*Primary Examiner* — Ahmed A Berhan
(74) *Attorney, Agent, or Firm* — SOLARIS Intellectual Property Group, PLLC

(57) ABSTRACT

A radiation generation device includes a radiation source unit that emits radiation, and at least one processor. The processor acquires distance information indicating a distance to a radiation detection device connected in a communicable manner, and derives, based on the distance information, an irradiation condition of the radiation in a case of capturing a radiation image based on the radiation emitted from the radiation source unit by using the radiation detection device.

9 Claims, 5 Drawing Sheets

RADIATION GENERATION DEVICE

CROSS-REFERENCE TO RELATED APPLICATIONS

The present application claims priority under 35 U.S.C. § 119 to Japanese Patent Application No. 2022-145493, filed on Sep. 13, 2022. The above application is hereby expressly incorporated by reference, in its entirety, into the present application.

BACKGROUND OF THE INVENTION

1. Technical Field

The disclosed technology relates to a radiation generation device.

2. Description of the Related Art

The following technologies are known as technologies related to a system including a radiation generation device and a radiation detection device. For example, JP2013-223539A describes a radiography system including a radiation generation device that includes a first wireless communication unit, and a radiation detection device that includes a second wireless communication unit that can perform wireless communication with the first wireless communication unit. After irradiation with radiation, imaging execution information is transmitted from the radiation generation device to the radiation detection device. Image data in which the imaging execution information is associated with a captured radiation irradiation image is generated. The image data is stored in an information storage unit provided in a housing of the radiation detection device.

JP2018-183397A describes a radiation irradiation detection system comprising a radiation generation device that includes a radiation generation unit that generates radiation and an emission controller that controls the emission of the radiation, and a radiation detection device that includes a radiation detector that detects the radiation transmitted through a subject. The radiation detection device includes a first wireless communication unit that outputs an emission permitting signal for permitting emission of the radiation as a wireless signal. The radiation generation device includes a second wireless communication unit that receives the emission permitting signal. In a case in which the emission permitting signal is received, the emission controller emits pulse-like radiation.

SUMMARY

A portable type radiation generation device that emits the radiation and a portable type radiation detection device that detects the radiation and generates the radiation image are used in home of a home care recipient in addition to a medical facility, such as a hospital. In a case of capturing the radiation image, appropriate imaging distance (distance between the radiation generation device and the radiation detection device) and radiation irradiation condition (tube current, irradiation time, and tube voltage) are determined according to an imaging part, an imaging posture, an imaging direction, and the like of a patient. However, in the field of home medical care, in some cases, it is difficult to secure a sufficient imaging distance. In a case in which an actual imaging distance deviates from a recommended value, it is preferable to change the irradiation condition of the radiation accordingly. However, it is not easy for a doctor in the field to flexibly take measures, such as changing the irradiation condition of the radiation according to the imaging distance.

The disclosed technology has been made in view of the points described above, and is to support the setting of an irradiation condition of radiation according to an imaging distance.

The disclosed technology relates to a radiation generation device comprising a radiation source unit that emits radiation, and at least one processor. The processor acquires distance information indicating a distance to a radiation detection device connected in a communicable manner, and derives, based on the distance information, an irradiation condition of the radiation in a case of capturing a radiation image based on the radiation emitted from the radiation source unit by using the radiation detection device.

The processor may derive the distance to the radiation detection device based on a wireless signal transmitted to and received from the radiation detection device. The processor may intermittently perform derivation of the distance to the radiation detection device, and may update the irradiation condition according to a fluctuation of the distance to the radiation detection device. The processor may update the irradiation condition in a case in which a fluctuation amount of the distance to the radiation detection device is equal to or larger than a threshold value. The processor may derive the fluctuation amount based on an average value of the distances derived over a plurality of times. The processor may derive the irradiation condition corresponding to the distance indicated by the distance information based on relationship information indicating a correspondence relationship between the distance to the radiation detection device and the irradiation condition. The processor may acquire imaging menu information indicating an imaging menu of the radiation image, and may derive the irradiation condition based on the imaging menu information and the distance information.

The radiation generation device may further comprise a display unit, and the processor may display the irradiation condition derived based on the distance information on the display unit. The radiation generation device may further comprise a camera that captures a visible light image in which an emission direction of the radiation emitted from the radiation source unit is an imaging direction. The processor may display imaging information indicating an imaging range of the radiation image on the display unit to be superimposed on the visible light image. The processor may change the information indicating the imaging range of the radiation image according to the distance indicated by the distance information. The radiation generation device may be a portable type.

According to the disclosed technology, the setting of the irradiation condition of the radiation according to the imaging distance can be supported.

BRIEF DESCRIPTION OF THE DRAWINGS

Exemplary embodiments according to the technique of the present disclosure will be described in detail based on the following figures, wherein.

DETAILED DESCRIPTION

Figure 1:
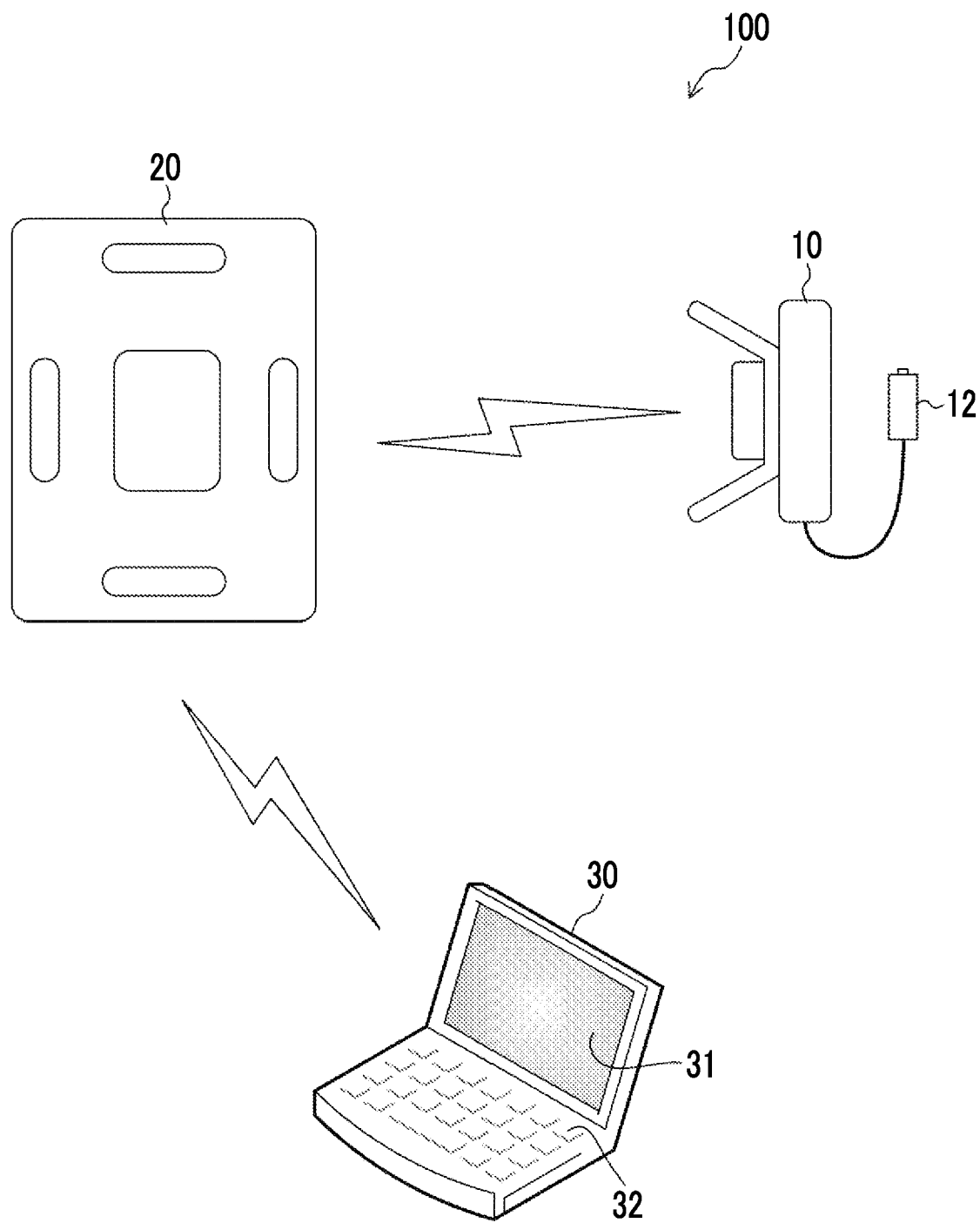
FIG. 1 is a diagram showing an example of a configuration of a radiography system according to an embodiment of the disclosed technology.

Hereinafter, an example of embodiments of the disclosed technology will be described with reference to the drawings. It should be noted that the same or equivalent components and portions in the drawings are assigned by the same reference numerals, and the overlapping description will be omitted.

FIG. 1 is a diagram showing an example of a configuration of a radiography system 100 according to the embodiment of the disclosed technology. The radiography system 100 includes a radiation generation device 10, a radiation detection device 20, and a console 30. The radiation generation device 10, the radiation detection device 20, and the console 30 are all portable types, and can be brought into home of a home care recipient and used, in addition to a medical facility, such as a hospital. The radiation generation device 10 emits radiation for capturing a radiation image. The radiation is, for example, X-rays. Details of the radiation generation device 10 will be described below.

The radiation detection device 20 detects the radiation emitted from the radiation generation device 10 and generates the radiation image. The radiation detection device 20 is a so-called flat panel detector (FPD), and has a detection panel (not shown) in which a plurality of pixels that accumulate charges corresponding to the radiation are arranged in a two-dimensional matrix. The radiation detection device 20 starts an accumulation operation of accumulating the charge in the pixel in a case in which the start of the irradiation with the radiation is detected, and starts a readout operation of reading out the charge accumulated in the pixel as an electric signal in a case in which the end of the irradiation with the radiation is detected. The radiation detection device 20 generates the radiation image based on the charge read out from the pixel.

The radiation detection device 20 includes a wireless communication module (not shown) for performing wireless communication between the radiation generation device 10 and the console 30. The radiation detection device 20 acquires imaging menu information indicating an imaging menu of the radiation image from the console 30 by the wireless communication before capturing of the radiation image. The imaging menu information includes information indicating an imaging part, an imaging posture, and an imaging direction of a subject (patient). The imaging part is, for example, a chest, a head, a neck, an abdomen, a waist, a shoulder, an elbow, a hand, a knee, or an ankle. The imaging posture is, for example, a standing position, a lying down position, or a sitting position. The imaging direction is, for example, a front side, a back side, or a lateral side. The radiation detection device 20 transmits the imaging menu information received from the console 30 to the radiation generation device 10 by the wireless communication. In addition, the radiation detection device 20 transmits the generated radiation image to the console 30 by the wireless communication.

The console 30 is, for example, a laptop-type or tablet-type computer. The console 30 includes a display 31 for displaying various screens, an input device 32, such as a keyboard and a mouse, a storage medium (not shown), such as a hard disk, for storing the radiation image transmitted from the radiation detection device 20, and a wireless communication module (not shown) for performing the wireless communication with the radiation detection device 20. A plurality of types of imaging menus are displayed on the display 31 of the console 30 in a selectable form. A user operates the input device 32 of the console 30 to select one imaging menu that matches an imaging technique designated in an imaging order from among the plurality of types of imaging menus. The imaging menu information indicating the selected imaging menu is transmitted to the radiation detection device 20 by the wireless communication. It is also possible to display the radiation image transmitted from the radiation detection device 20 on the display 31 of the console 30.

Figure 2:
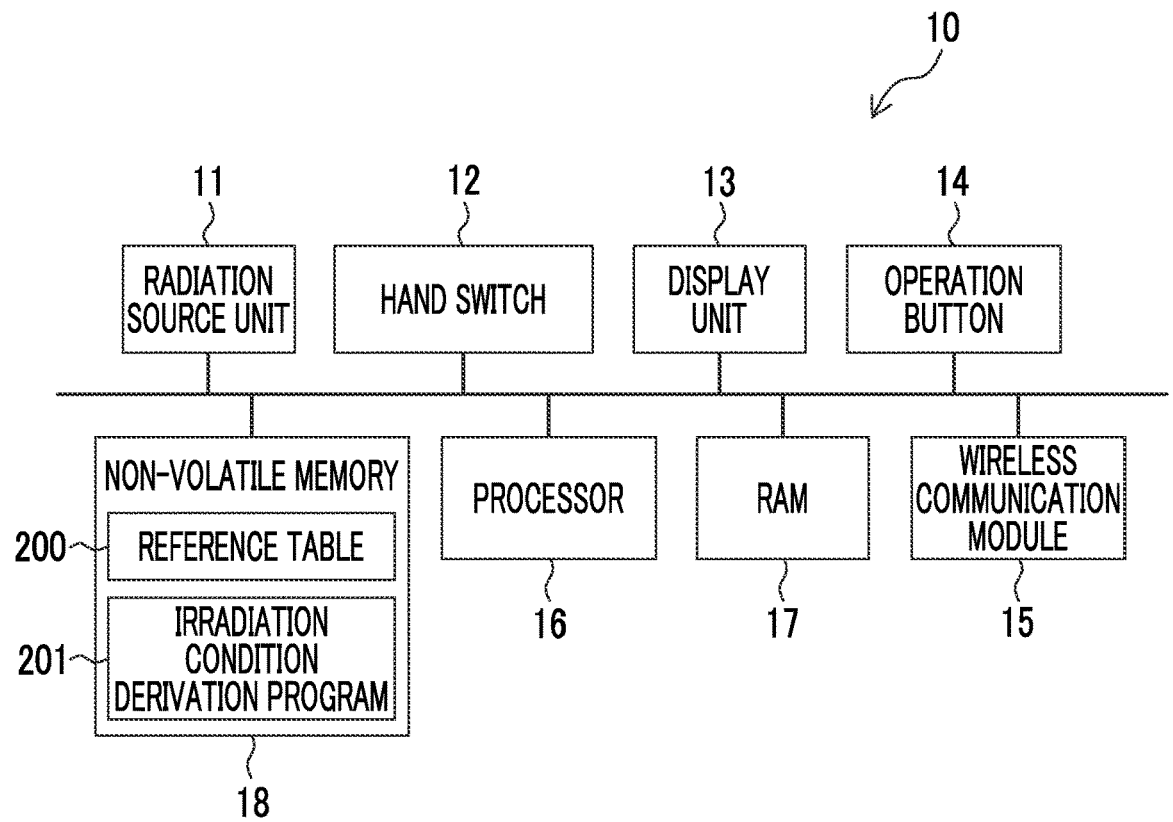
FIG. 2 is a diagram showing an example of a hardware configuration of a radiation generation device according to the embodiment of the disclosed technology.

FIG. 2 is a diagram showing an example of a hardware configuration of the radiation generation device 10. The radiation generation device 10 includes a radiation source unit 11, a hand switch 12, a display unit 13, an operation button 14, a wireless communication module 15, a processor 16, a random access memory (RAM) 17, and a non-volatile memory 18.

The radiation source unit 11 includes a radiation tube and an irradiation field limiting device (none of which are shown). A filament, a target, a grid electrode, and the like (none of which are shown) are provided in the radiation tube. A voltage is applied between the filament which is a cathode, and the target which is an anode. The voltage, which is applied between the filament and the target, is called a tube voltage. The filament releases thermoelectrons according to the applied tube voltage toward the target. The target emits the radiation by the collision of the thermoelectrons from the filament. The grid electrode is disposed between the filament and the target. The grid electrode changes a flow rate of the thermoelectrons from the filament toward the target according to the applied voltage. The flow rate of the thermoelectrons from the filament toward the target is called a tube current.

The irradiation field limiting device is also called a collimator, and limits an irradiation field of the radiation emitted from the radiation tube. The irradiation field limiting device has a configuration in which four shielding plates, such as lead, which shield the radiation are disposed on respective sides of a quadrangle and an emission opening of the quadrangle which transmits the radiation is formed in a central portion, for example. The irradiation field limiting device changes the irradiation field of the radiation by changing a size of the emission opening by changing a position of each shielding plate.

The hand switch 12 is a switch operated by the user in a case of causing the radiation source unit 11 to start the emission of the radiation.

Figure 5:
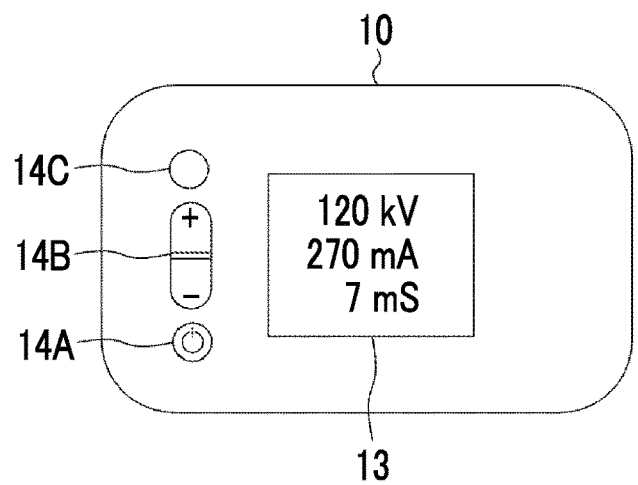
FIG. 5 is a diagram showing an example of a display screen of a display unit according to the embodiment of the disclosed technology.

The display unit 13 is a display for displaying various types of information. As shown in FIG. 5, the display unit 13 is provided on a back surface of the radiation generation device 10. For example, an irradiation condition of the radiation is displayed on the display unit 13.

The operation button 14 is operated in a case in which the radiation generation device 10 is manually operated. The operation button 14 is provided on the back surface of the radiation generation device 10. As shown in FIG. 5, for example, the operation button 14 may include a power button 14A, an adjustment button 14B for adjusting the tube voltage and the tube current, an irradiation field setting button 14C for setting the irradiation field, and the like.

The wireless communication module 15 is an electronic component including a controller for performing the wireless communication with the radiation detection device 20 and software. The wireless communication between the radiation generation device 10, the radiation detection device 20, and the console 30 may conform to, for example, a Wi-Fi standard or a Bluetooth (registered trademark) standard.

The non-volatile memory 18 is a non-volatile storage medium, such as a flash memory. A reference table 200 and an irradiation condition derivation program 201 are stored in the non-volatile memory 18. The RAM 17 is a work memory for the processor 16 to execute processing. The processor 16 loads the irradiation condition derivation program 201 stored in the non-volatile memory 18 into the RAM 17 to execute processing according to the irradiation condition derivation program 201. The reference table 200 is a table that is referred to in a case in which the processor 16 derives the irradiation condition of the radiation according to the irradiation condition derivation program 201. The reference table 200 is an example of "relationship information" according to the disclosed technology. Details of the reference table 200 will be described below.

Figure 3:
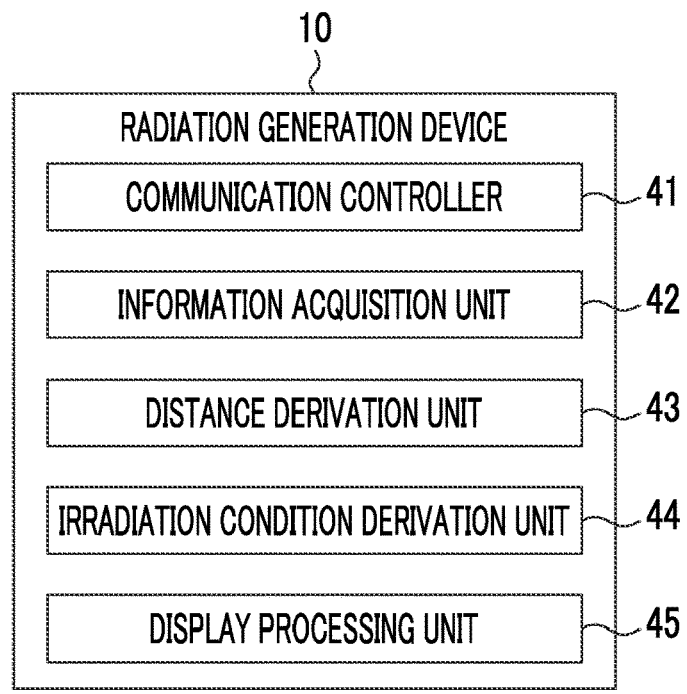
FIG. 3 is a functional block diagram showing an example of a functional configuration of the radiation generation device according to the embodiment of the disclosed technology.

FIG. 3 is a functional block diagram showing an example of a functional configuration of the radiation generation device 10 in a case in which the processor 16 performs irradiation condition derivation processing (see FIG. 6) according to the irradiation condition derivation program 201. The processor 16 executes the irradiation condition derivation program 201 to function as a communication controller 41, an information acquisition unit 42, a distance derivation unit 43, an irradiation condition derivation unit 44, and a display processing unit 45.

The communication controller 41 operates the wireless communication module 15 to establish a communication link with the radiation detection device 20. In the present embodiment, the radiation detection device 20 functions as an access point in the wireless communication. The establishment of the communication link between the radiation generation device 10 and the radiation detection device 20 follows the following procedure. First, the communication controller 41 scans an available frequency band. The communication controller 41 acquires information on available channels and the information on a service set identifier (SSID) based on information included in a beacon signal transmitted from the radiation detection device 20 that functions as the access point. Next, the communication controller 41 and the radiation detection device 20 check whether the SSIDs match each other. Next, the communication controller 41 and the radiation detection device 20 perform authentication with each other by using an authentication packet. Next, the communication controller 41 makes an association request to the radiation detection device 20. The radiation detection device 20 that receives the association request makes an association response. By executing the processing described above, the communication link is established between the radiation generation device 10 and the radiation detection device 20, and the data communication can be performed between the radiation generation device 10 and the radiation detection device 20. The radiation detection device 20 transmits the imaging menu information received from the console 30 to the radiation generation device 10 via the communication link.

The information acquisition unit 42 acquires the imaging menu information transmitted from the radiation detection device 20. As described above, the imaging menu information includes the information indicating the imaging part, the imaging posture, and the imaging direction of the subject (patient).

The distance derivation unit 43 derives a distance (imaging distance) from the radiation generation device 10 to the radiation detection device 20 based on a wireless signal transmitted to and received from the radiation detection device 20 connected in a communicable manner by establishing the communication link. Specifically, the distance derivation unit 43 derives the distance from the radiation generation device 10 to the radiation detection device 20 based on a radio wave intensity of the beacon signal transmitted from the radiation detection device 20 connected in a communicable manner. As the distance from the radiation generation device 10 to the radiation detection device 20 is shorter, the radio wave intensity of the beacon signal is higher. It should be noted that the beacon signal includes the SSID of the radiation detection device 20, the channel (frequency) information, and the like. The distance derivation unit 43 generates distance information indicating the derived distance. The distance information may be indicated by a physical quantity, such as "134 cm", or may be indicated by a class value, such as "1", "2", or "3", according to the distance.

The irradiation condition derivation unit 44 derives the irradiation condition of the radiation in a case in which the radiation image based on the radiation emitted from the radiation source unit 11 is captured by the radiation detection device 20, based on the imaging menu information acquired by the information acquisition unit 42 and the distance information indicating the distance derived by the distance derivation unit 43. The irradiation condition derivation unit 44 derives the irradiation condition with reference to the reference table 200 stored in the non-volatile memory 18.

Figure 4:
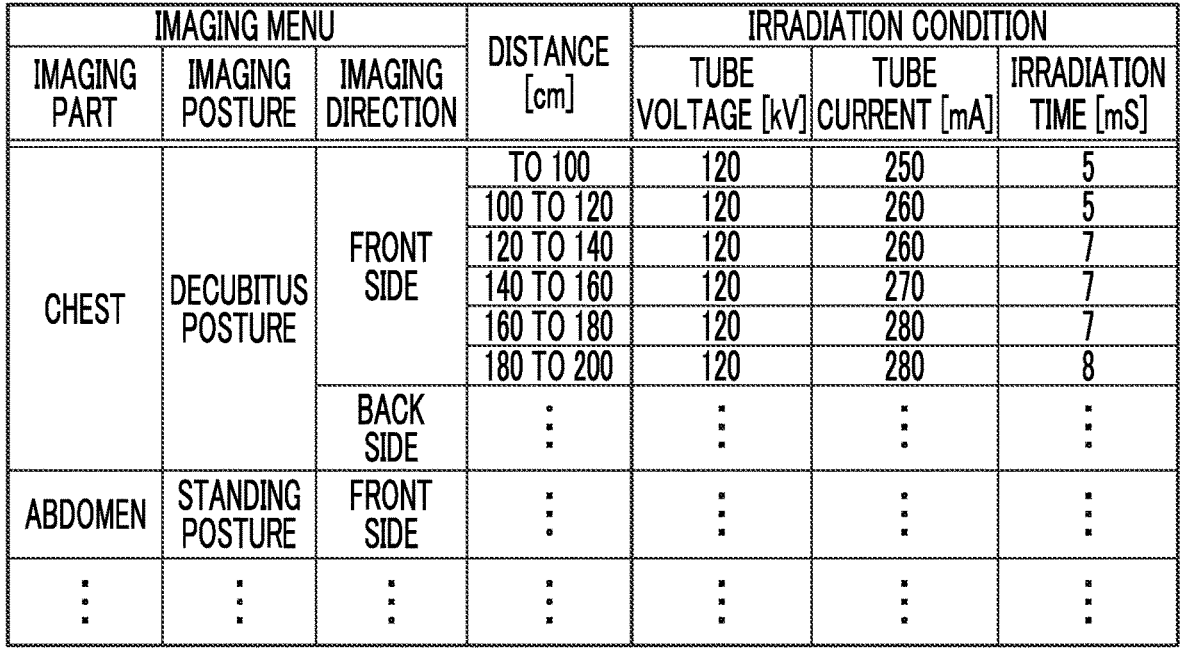
FIG. 4 is a diagram showing an example of a reference table according to the embodiment of the disclosed technology.

FIG. 4 is a diagram showing an example of the reference table 200. The reference table 200 is a table in which a combination of the imaging menu, the distance from the radiation generation device 10 to the radiation detection device 20, and the irradiation condition of the radiation are associated with each other. The imaging menu includes the imaging part, the imaging posture, and the imaging direction. The irradiation condition includes the tube voltage, the tube current, and an irradiation time. The irradiation condition derivation unit 44 derives the irradiation condition corresponding to the combination of the imaging menu indicated by the imaging menu information and the distance to the radiation detection device 20 indicated by the distance information, with reference to the reference table 200. For example, in a case in which the imaging part is "chest", the imaging posture is "lying down position", and the imaging direction is "front side", which are indicated by the imaging menu information, and the distance to the radiation detection device 20 indicated by the distance information is "150 cm", the irradiation condition derivation unit 44 derives "120 kV"

of the tube voltage, "270 mA" of the tube current, and "7 mS" of the irradiation time as the irradiation condition based on the reference table 200. It should be noted that it is also possible to apply the tube current time product as the irradiation condition.

The display processing unit 45 performs processing of displaying the irradiation condition of the radiation derived by the irradiation condition derivation unit 44 on the display unit 13. FIG. 5 is a diagram showing an example of a display screen of the display unit 13 on which the irradiation condition is displayed. The user can adjust the irradiation condition displayed on the display unit 13 by operating the adjustment button 14B. The irradiation condition derived by the irradiation condition derivation unit 44 or the irradiation condition adjusted by the user is set as the irradiation condition in a case of capturing the radiation image.

Figure 6:
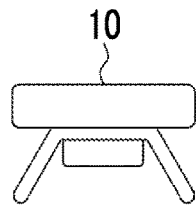
FIG. 6 is a diagram showing an example of a position of a subject in a case of capturing a radiation image.
Figure 6:
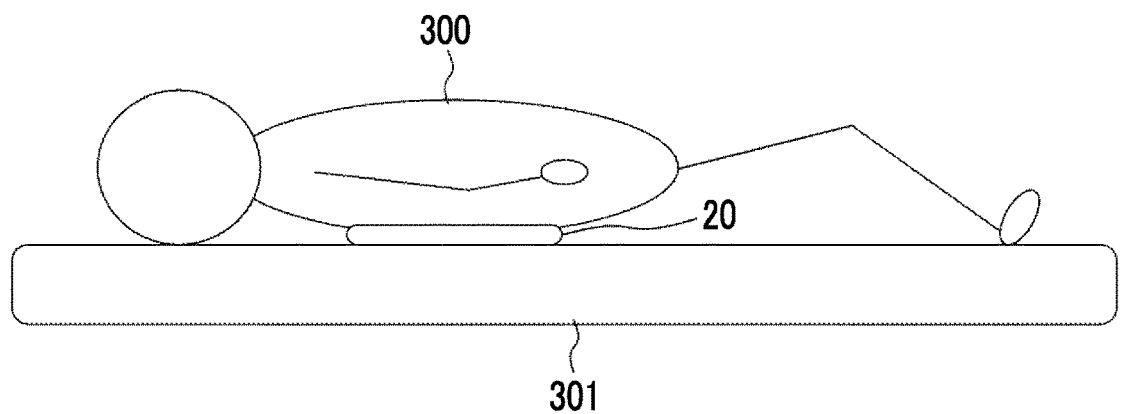

The subject (patient) is positioned before capturing the radiation image. FIG. 6 is a diagram showing an example of a position of a subject 300 in a case in which the imaging part is "abdomen", the imaging posture is "lying down position", and the imaging direction is the "front side". As shown in FIG. 6, the subject 300 is in a state of lying on its back on a bed 301. The radiation generation device 10 is positioned such that the irradiation field of the radiation includes the abdomen, which is the imaging part of the subject 300. The radiation generation device 10 is held by a holder (not shown) and fixed at a positioned position. The radiation detection device 20 is inserted between the subject 300 and the bed 301, and is positioned immediately below the radiation generation device 10 such that a detection region of the radiation includes the irradiation field of the radiation.

Figure 7:
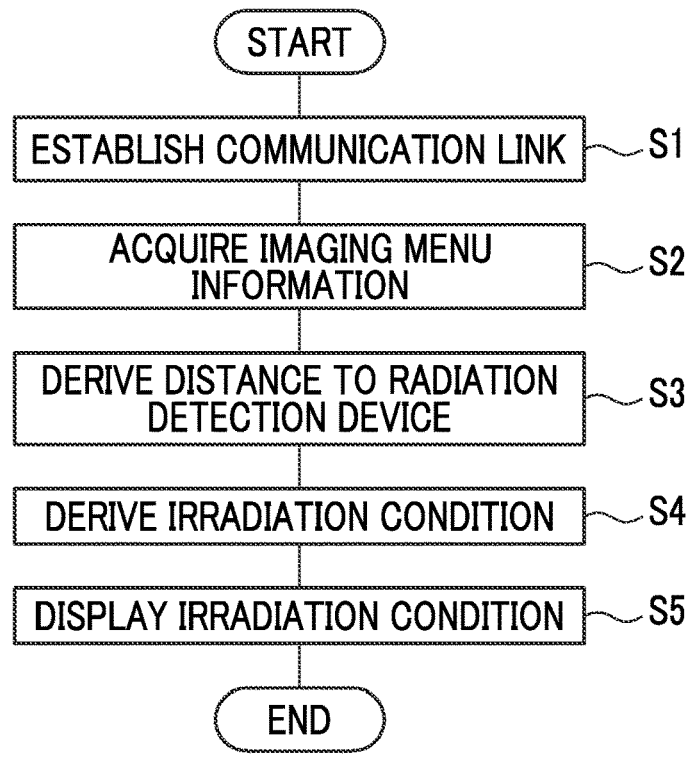
FIG. 7 is a flowchart showing an example of a flow of irradiation condition derivation processing according to the embodiment of the disclosed technology.

FIG. 7 is a flowchart showing an example of a flow of the irradiation condition derivation processing implemented by the processor 16 executing the irradiation condition derivation program 201. The irradiation condition derivation program is executed in a case in which the user makes an instruction to start the processing by operating the operation button 14 or the like after the positioning of the subject is completed.

In step S1, the communication controller 41 operates the wireless communication module 15 to establish the communication link with the radiation detection device 20.

In step S2, the information acquisition unit 42 acquires the imaging menu information transmitted from the radiation detection device 20 via the communication link established in step S1.

In step S3, the distance derivation unit 43 derives the distance from the radiation generation device 10 to the radiation detection device 20 based on the wireless signal transmitted to and received from the radiation detection device 20 via the communication link established in step S1. Specifically, the distance derivation unit 43 derives the distance from the radiation generation device 10 to the radiation detection device 20 based on the radio wave intensity of the beacon signal transmitted from the radiation detection device 20. The distance derivation unit 43 generates the distance information indicating the derived distance.

In step S4, the irradiation condition derivation unit 44 derives the irradiation condition of the radiation in a case in which the radiation image based on the radiation emitted from the radiation source unit 11 is captured by the radiation detection device 20, based on the imaging menu information acquired in step S2 and the distance information indicating the distance derived in step S3. The irradiation condition derivation unit 44 derives the irradiation condition with reference to the reference table 200 stored in the non-volatile memory 18.

In step S5, the display processing unit 45 performs the processing of displaying the irradiation condition of the radiation derived in step S4 on the display unit 13. The user can adjust the irradiation condition displayed on the display unit 13 by operating the adjustment button 14B. The irradiation condition derived by the irradiation condition derivation unit 44 or the irradiation condition adjusted by the user is set as the irradiation condition in a case of capturing the radiation image.

Thereafter, in a case in which the user operates the hand switch 12, the radiation is emitted from the radiation source unit 11 according to the set irradiation condition, and the radiation detection device 20 generates the radiation image. The radiation image is transmitted to the console 30 via the communication link established between the radiation detection device 20 and the console 30.

As described above, the radiation generation device 10 according to the embodiment of the disclosed technology acquires the distance information indicating the distance to the radiation detection device 20 connected in a communicable manner. In the present embodiment, the radiation generation device 10 derives the distance to the radiation detection device 20 based on the wireless signal transmitted to and received from the radiation detection device 20 to acquire the distance information. The radiation generation device 10 derives, based on the distance information, the irradiation condition of the radiation in a case in which the radiation image based on the radiation emitted from the radiation source unit 11 is captured by the radiation detection device 20.

The radiation generation device 10, the radiation detection device 20, and the console 30 according to the embodiment of the disclosed technology are all the portable types, and can be used in home of the home care recipient, in addition to the medical facility, such as the hospital. In a case of capturing the radiation image, appropriate imaging distance and radiation irradiation condition (tube current, irradiation time, and tube voltage) are determined according to the imaging part, the imaging posture, the imaging direction, and the like of the patient. However, in the field of home medical care, in some cases, it is difficult to secure a sufficient imaging distance. In a case in which an actual imaging distance deviates from a recommended value, it is preferable to change the irradiation condition of the radiation accordingly. However, it is not easy for a doctor in the field to flexibly take measures, such as changing the irradiation condition of the radiation according to the imaging distance.

With the radiation generation device 10 according to the embodiment of the disclosed technology, the distance (imaging distance) between the radiation generation device 10 and the radiation detection device 20 is derived in real time to acquire the distance information. Then, based on the distance information, an appropriate irradiation condition of the radiation according to the imaging distance is derived. As a result, for example, in the field of home medical care, even in a case in which the imaging distance deviates from the recommended value, it is possible to derive an appropriate irradiation condition according to the actual imaging distance. That is, with the radiation generation device 10 according to the embodiment of the disclosed technology, it is possible to support the setting of the irradiation condition of the radiation according to the imaging distance.

In addition, the distance from the radiation generation device 10 to the radiation detection device 20 is derived by using the communication link established between the radiation generation device 10 and the radiation detection device 20. As a result, the real-time distance measurement can be realized without providing a dedicated distance measurement unit.

Here, in a case of capturing the radiation image, it is recommended that the radiation generation device 10 be fixed by the holder. However, in the field of home medical care, in some cases, it is difficult to install the holder, and it is assumed that the radiation image is captured in a state in which the radiation generation device 10 is held by a hand of the doctor. In this case, there is a risk that the distance (imaging distance) from the radiation generation device 10 to the radiation detection device 20 is unstable. Therefore, it is preferable to make the irradiation condition follows the fluctuation of the imaging distance. Therefore, the distance derivation unit 43 performs derivation of the distance to the radiation detection device 20 intermittently (for example, every 1 second to several seconds). The irradiation condition derivation unit 44 updates the irradiation condition according to the fluctuation of the distance derived by the distance derivation unit 43.

The irradiation condition derivation unit 44 may update the irradiation condition in a case in which the fluctuation amount of the distance to the radiation detection device 20 is equal to or larger than a threshold value. In this case, the irradiation condition derivation unit 44 may derive the fluctuation amount of the distance to the radiation detection device 20 based on an average value of the distances derived over a plurality of times. Thereby, it is possible to suppress the frequent update of the irradiation condition with the fluctuation in the distance to the radiation detection device 20.

It should be noted that, in the present embodiment, as an example, the case is described in which the radiation generation device 10 performs the derivation of the distance to the radiation detection device 20 and the generation of the distance information, but the radiation detection device 20 may perform the derivation of the distance to the radiation generation device 10 and the generation of the distance information. In this case, the radiation generation device 10 acquires the distance information transmitted from the radiation detection device 20.

Further, in the present embodiment, the aspect is described in which the distance (imaging distance) between the radiation generation device 10 and the radiation detection device 20 is derived based on the radio wave intensity of the beacon signal transmitted from the radiation detection device 20 connected in a communicable manner, but the disclosed technology is not limited to this aspect. For example, the distance between the radiation detection device 20 and the radiation generation device 10 may be derived by a distance measurement method using an ultra wide band (UWB) signal. For example, the UWB signal having a pulse width on the order of nanoseconds is transmitted from the radiation detection device 20, and the distance derivation unit 43 of the radiation generation device 10 receives the UWB signal. The distance derivation unit 43 measures a time of arrival (TOA) of the UWB signal, and derives a product of the time of arrival and the light velocity as the distance (imaging distance) between the radiation detection device 20 and the radiation generation device 10. With the distance measurement method using the UWB signal, the distance measurement can be performed with higher accuracy than the distance measurement method based on the radio wave intensity of the beacon signal. The radiation detection device 20 and the radiation generation device 10 may each comprise a dedicated transmitter/receiver for transmitting and receiving the UWB signal. In addition, it is also possible to apply the technology described in JP2006-158845A as the distance measurement method using the wireless signal.

In addition, in the present embodiment, as an example, the case is described in which the irradiation condition of the radiation is derived based on both the imaging menu information and the distance information, but the irradiation condition of the radiation may be derived based only on the distance information. In this case, instead of the reference table 200, a relational expression indicating the relationship between the imaging distance and the imaging condition (tube current, irradiation time, tube voltage) may be used to derive the irradiation condition according to the distance indicated by the distance information.

In addition, in the present embodiment, as an example, the case is described in which the radiation generation device 10, the radiation detection device 20, and the console 30 are all the portable types, but the form of each of these devices is not particularly limited.

Second Embodiment

Figure 8:
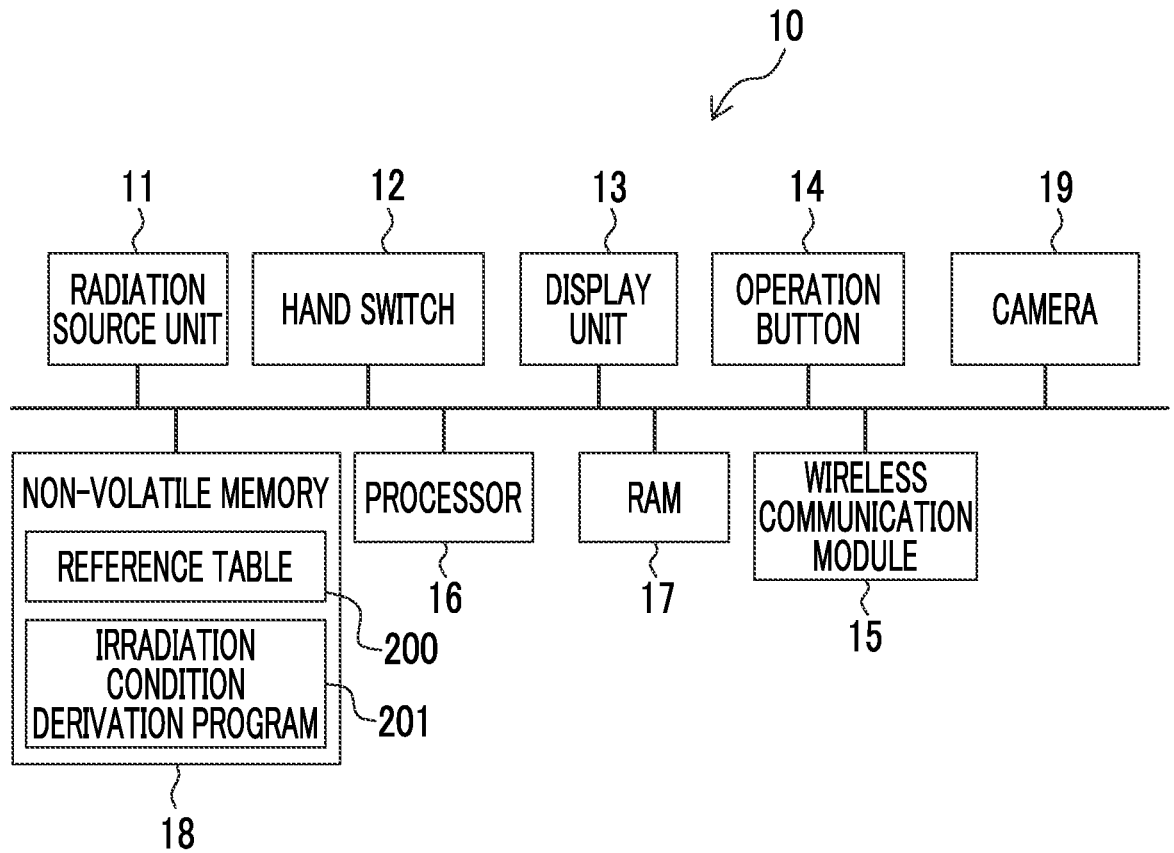
FIG. 8 is a diagram showing an example of the hardware configuration of the radiation generation device according to the embodiment of the disclosed technology.

FIG. 8 is a diagram showing an example of a hardware configuration of the radiation generation device 10 according to the second embodiment of the disclosed technology. The radiation generation device 10 according to the second embodiment is different from the radiation generation device 10 according to the first embodiment (see FIG. 2) in that a camera 19 is further provided. The camera 19 captures a visible light image in which an emission direction of the radiation emitted from the radiation source unit 11 is the imaging direction. A functional configuration of the radiation generation device 10 according to the present embodiment is the same as that of the radiation generation device 10 (see FIG. 3) according to the first embodiment.

Figure 9:
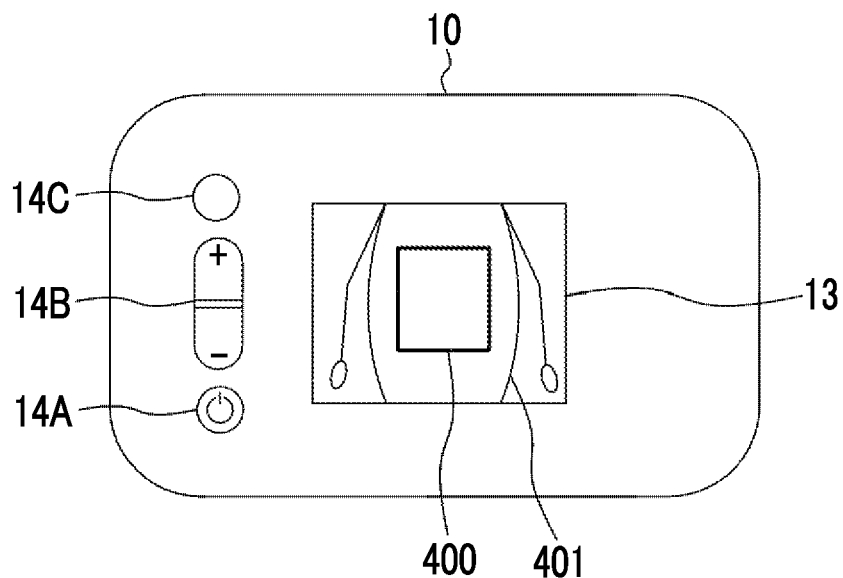
FIG. 9 is a diagram showing an example of the display screen of the display unit according to the embodiment of the disclosed technology.

In the present embodiment, the display processing unit 45 displays information indicating an imaging range of the radiation image on the display unit 13 to be superimposed on the visible light image captured by the camera 19. The imaging range of the radiation image can also be said to be the irradiation range of the radiation emitted from the radiation source unit 11. FIG. 9 shows a state in which a frame line 400 as the information indicating the imaging range of the radiation image is displayed on the display unit 13 to be superimposed on the visible light image 401 of the subject captured by the camera 19. The display processing unit 45 changes the information indicating the imaging range of the radiation image according to the distance indicated by the distance information. That is, the display processing unit 45 determines a size of the frame line 400 based on the distance (imaging distance) to the radiation detection device 20 derived by the distance derivation unit 43. Since the radiation emitted from the radiation source unit 11 travels while spreading, the imaging range (irradiation range) of the radiation image is wider as the distance to the radiation detection device 20 is longer. Therefore, the display processing unit 45 makes the size of the frame line 400 to be displayed on the display unit 13 larger as the distance derived by the distance derivation unit 43 is longer. With the radiation generation device 10 according to the present embodiment, it is possible to support the positioning work by performing the display as shown in FIG. 9 in a case in which the positioning of the subject is performed, for example.

In the embodiments described above, for example, as a hardware structure of the processing unit that executes various pieces of processing, such as the communication controller 41, the information acquisition unit 42, the distance derivation unit 43, the irradiation condition derivation unit 44, and the display processing unit 45, various processors as described below can be used. The various processors include, in addition to a CPU and a GPU, which are general-purpose processors which execute software (program) and function as various processing units as described above, a programmable logic device (PLD) which is a processor whose circuit configuration can be changed after manufacture, such as an FPGA, and a dedicated electric circuit which is a processor having a circuit configuration which is designed for exclusive use in order to execute specific processing, such as an application specific integrated circuit (ASIC).

One processing unit may be configured by using one of the various processors or may be configured by using a combination of two or more processors of the same type or different types (for example, a combination of a plurality of FPGAs or a combination of a CPU and an FPGA). In addition, a plurality of the processing units may be configured by using one processor.

A first example of the configuration in which the plurality of processing units are configured by using one processor is a form in which one processor is configured by using a combination of one or more CPUs and the software and this processor functions as the plurality of processing units, as represented by computers, such as a client and a server. A second example thereof is a form of using a processor that realizes the function of the entire system including the plurality of processing units by one integrated circuit (IC) chip, as represented by a system on chip (SoC) or the like. In this way, as the hardware structure, the various processing units are configured by using one or more of the various processors described above.

Further, more specifically, as the hardware structure of the various processors, an electric circuit (circuitry) in which circuit elements, such as semiconductor elements, are combined can be used.

Moreover, in the embodiments described above, the aspect is described in which the irradiation condition derivation program 201 is stored (installed) in advance in the non-volatile memory 18, but the disclosed technology is not limited to this. The irradiation condition derivation program 201 may be provided in a form of being recorded in a recording medium, such as a compact disc read only memory (CD-ROM), a digital versatile disc read only memory (DVD-ROM), and a universal serial bus (USB) memory. Moreover, the irradiation condition derivation program 201 may be provided in a form being downloaded from an external device via a network. That is, the program (that is, a program product) described in the present embodiment may be provided by the recording medium or in a form of being distributed from an external computer.

In regard to the first and second embodiments described above, the following additional remarks will be further disclosed.

Additional Remark 1

A radiation generation device comprising a radiation source unit that emits radiation, and at least one processor, in which the processor acquires distance information indicating a distance to a radiation detection device connected in a communicable manner, and derives, based on the distance information, an irradiation condition of the radiation in a case of capturing a radiation image based on the radiation emitted from the radiation source unit by using the radiation detection device.

Additional Remark 2

The radiation generation device according to additional remark 1, in which the processor derives the distance to the radiation detection device based on a wireless signal transmitted to and received from the radiation detection device.

Additional Remark 3

The radiation generation device according to additional remark 1 or 2, in which the processor intermittently performs derivation of the distance to the radiation detection device, and updates the irradiation condition according to a fluctuation of the distance to the radiation detection device.

Additional Remark 4

The radiation generation device according to additional remark 3, in which the processor updates the irradiation condition in a case in which a fluctuation amount of the distance to the radiation detection device is equal to or larger than a threshold value.

Additional Remark 5

The radiation generation device according to additional remark 4, in which the processor derives the fluctuation amount based on an average value of the distances derived over a plurality of times.

Additional Remark 6

The radiation generation device according to any one of additional remarks 1 to 5, in which the processor derives the irradiation condition corresponding to the distance indicated by the distance information based on relationship information indicating a correspondence relationship between the distance to the radiation detection device and the irradiation condition.

Additional Remark 7

The radiation generation device according to any one of additional remarks 1 to 6, in which the processor acquires imaging menu information indicating an imaging menu of the radiation image, and derives the irradiation condition based on the imaging menu information and the distance information.

Additional Remark 8

The radiation generation device according to any one of additional remarks 1 to 7, further comprising a display unit, in which the processor displays the irradiation condition derived based on the distance information on the display unit.

Additional Remark 9

The radiation generation device according to additional remark 8, further comprising a camera that captures a visible light image in which an emission direction of the radiation emitted from the radiation source unit is an imaging direction, in which the processor displays information indicating an imaging range of the radiation image on the display unit to be superimposed on the visible light image.

Additional Remark 10

The radiation generation device according to additional remark 9, in which the processor changes the information indicating the imaging range of the radiation image according to the distance indicated by the distance information.

Additional Remark 11

The radiation generation device according to any one of additional remarks 1 to 10, in which the radiation generation device is a portable type.

What is claimed is:

1. A radiation generation device comprising:
a radiation source unit that emits radiation;
a display unit;
at least one processor; and
a camera that captures a visible light image in which an emission direction of the radiation emitted from the radiation source unit is an imaging direction,
wherein the at least one processor:
acquires distance information indicating a distance to a radiation detection device connected in a communicable manner,
derives, based on the distance information, an irradiation condition of the radiation in a case of capturing a radiation image based on the radiation emitted from the radiation source unit by using the radiation detection device,
displays the irradiation condition, derived based on the distance information, on the display unit, and
displays information indicating an imaging range of the radiation image on the display unit to be superimposed on the visible light image.

2. The radiation generation device according to claim 1, wherein the at least one processor changes the information indicating the imaging range of the radiation image according to the distance indicated by the distance information.

3. The radiation generation device according to claim 1, wherein the radiation generation device is a portable type.

4. The radiation generation device according to claim 1, wherein the at least one processor derives the distance to the radiation detection device based on a wireless signal transmitted to and received from the radiation detection device.

5. The radiation generation device according to claim 4, wherein the at least one processor
intermittently performs derivation of the distance to the radiation detection device, and
updates the irradiation condition according to a fluctuation of the distance to the radiation detection device.

6. The radiation generation device according to claim 5, wherein the at least one processor updates the irradiation condition in a case in which a fluctuation amount of the distance to the radiation detection device is equal to or larger than a threshold value.

7. The radiation generation device according to claim 6, wherein the at least one processor derives the fluctuation amount based on an average value of the distances to the radiation detection device derived over a plurality of times.

8. The radiation generation device according to claim 1, wherein the at least one processor derives the irradiation condition corresponding to the distance indicated by the distance information based on relationship information indicating a correspondence relationship between the distance to the radiation detection device and the irradiation condition.

9. The radiation generation device according to claim 1, wherein the at least one processor
acquires imaging menu information indicating an imaging menu of the radiation image, and
derives the irradiation condition based on the imaging menu information and the distance information.

* * * * *